(12) United States Patent
Garcia

(10) Patent No.: US 6,625,629 B1
(45) Date of Patent: Sep. 23, 2003

(54) SYSTEM AND METHOD FOR SIGNAL PROCESSING USING AN IMPROVED CONVOLUTION TECHNIQUE

(75) Inventor: Guillermo Garcia, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/577,171

(22) Filed: May 23, 2000

(51) Int. Cl.[7] ............................................... G06F 17/10
(52) U.S. Cl. ....................................... 708/315; 708/321
(58) Field of Search ................................... 708/315, 321

(56) References Cited

U.S. PATENT DOCUMENTS

| | | | |
|---|---|---|---|
| 4,992,967 A | * 2/1991 | Auvray | 708/321 |
| 5,270,953 A | * 12/1993 | White | 708/321 |
| 5,473,555 A | * 12/1995 | Potter | 708/313 |
| 2001/0032225 A1 | * 10/2001 | Tal et al. | 708/300 |

OTHER PUBLICATIONS

William G. Gardner; "Efficient Convolution Without Input/Output Delay;" Journal of the Audio Engineering Society Audio/Acoustics/Applications, vol. 43, No. 3; pp. 127–136, Mar. 1995.

Pierre Duhamel and Martin Vetterli; "Improved Fourier and Hartley Transform Algorithms: Application to Cyclic Convolution of Real Data;" IEEE Transactions on Acoustics, Speech, and Signal Processing, vol. ASSP–35, No. 6; pp. 818–824, Jun. 1987.

R. Meyer, R. Reng and K. Schwarz; "Convolution Algorithms on DSP Processors;" 1991 International Conference on Acoustics, Speech, and Signal Processing, vol. 3; pp. 2193–2196, May 14–17, 1991.

Alan V. Oppenheim and Ronald W. Schafer; "Discrete–Time Signal Processing;" pp. 553–561; 720–722, 1975.

Henrik V. Sorensen and C. Sidney Burrus; "Fast DFT and Convolution Algorithms;" Handbook for Digital Signal Processing; pp. 491–517, 1993.

* cited by examiner

*Primary Examiner*—David H. Malzahn
(74) *Attorney, Agent, or Firm*—Lee & Hayes, PLLC

(57) ABSTRACT

A system (100) for signal processing using one or more filters includes a controller (102) that partitions an impulse response of a filter into a plurality of impulse response blocks and calculates a Discrete Fourier Transform (DFT) of each impulse response block using a Fast Fourier Transform (FFT) algorithm. A processor (104) that is coupled to the controller (102) receives an input sample block including samples of a signal to be processed and receives the DFT of each impulse response block from the controller (102). The processor (104) calculates a DFT of the input sample block using an FFT algorithm, performs a spectral multiplication of the DFT of the input sample block with the DFT of each impulse response block, overlap-adds the blocks resulting from each spectral multiplication to create an output spectral block, performs an inverse FFT on the output spectral block to create an output sample block, and communicates the output sample block.

32 Claims, 10 Drawing Sheets

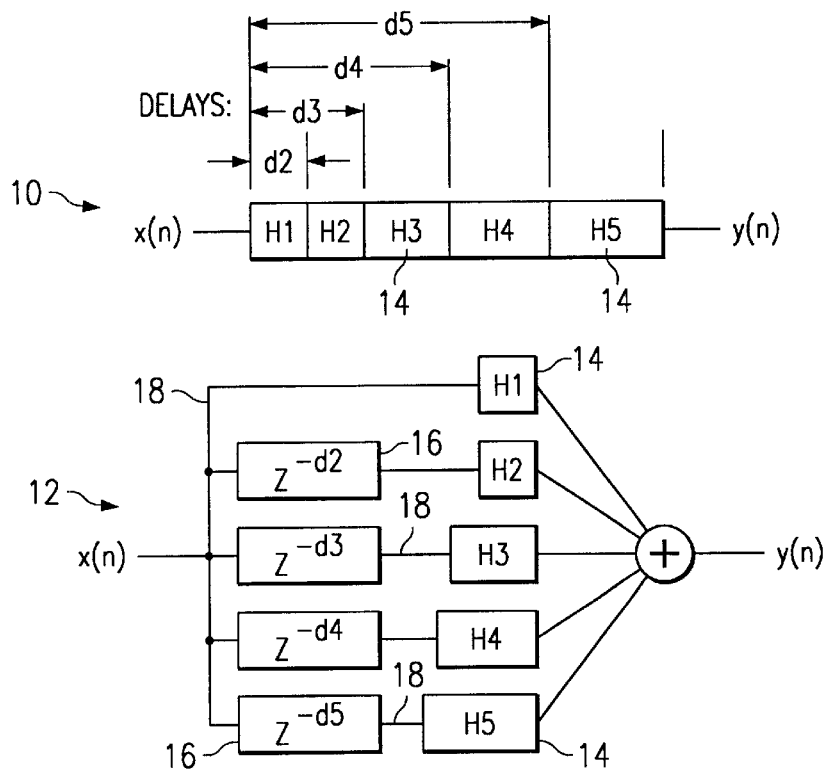
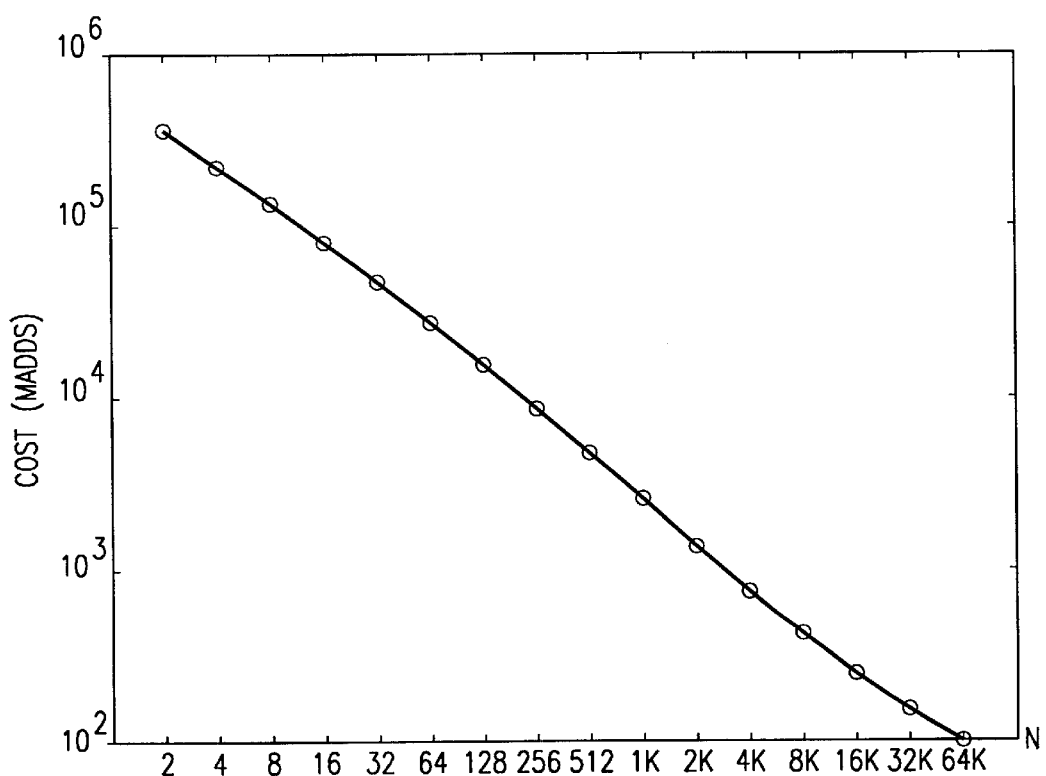
FIG. 1
FIG. 2

| POINTER POSITION | BLOCK SIZE | BLOCK FRACTION POINTED | STATE ID |
|---|---|---|---|
| 0 | N | (ONLY ONE FRACTION) | 1.1 |
| 1 N | N | (ONLY ONE FRACTION) | 1.1 |
| 2 N | N | (ONLY ONE FRACTION) | 1.1 |
|  | 2 N | FIRST HALF | 2.1 |
| 3 N | N | (ONLY ONE FRACTION) | 1.1 |
|  | 2 N | FIRST HALF | 2.1 |
|  | 2 N | SECOND HALF | 2.2 |
| 4 N | N | (ONLY ONE FRACTION) | 1.1 |
|  | 2 N | FIRST HALF | 2.1 |
|  | 2 N | SECOND HALF | 2.2 |
|  | 4 N | FIRST QUARTER | 4.1 |
| 5 N | N | (ONLY ONE FRACTION) | 1.1 |
|  | 2 N | FIRST HALF | 2.1 |
|  | 2 N | SECOND HALF | 2.2 |
|  | 4 N | FIRST QUARTER | 4.1 |
|  | 4 N | SECOND QUARTER | 4.2 |
| 6 N | N | (ONLY ONE FRACTION) | 1.1 |
|  | 2 N | FIRST HALF | 2.1 |
|  | 2 N | SECOND HALF | 2.2 |
|  | 4 N | FIRST QUARTER | 4.1 |
|  | 4 N | SECOND QUARTER | 4.2 |
|  | 4 N | THIRD QUARTER | 4.3 |
| 7 N | N | (ONLY ONE FRACTION) | 1.1 |
|  | 2 N | FIRST HALF | 2.1 |
|  | 2 N | SECOND HALF | 2.2 |
|  | 4 N | FIRST QUARTER | 4.1 |
|  | 4 N | SECOND QUARTER | 4.2 |
|  | 4 N | THIRD QUARTER | 4.3 |
|  | 4 N | FOURTH QUARTER | 4.4 |

*FIG. 14*

| POINTER POSITION | 0  N  2N  3N  4N  5N  6N  7N  8N | STATE I.D. |
|---|---|---|
| 0 | ▭ | 1.1 |
| N | ▭ | 1.1 |
| 2 N | ▭▭ | 1.1<br>2.1 |
| 3 N | ▭▭▭ | 1.1<br>2.1<br>2.2 |
| 4 N | ▭▭▭▭ | 1.1<br>2.1<br>2.2<br>4.1 |
| 5 N | ▭▭▭▭▭ | 1.1<br>2.1<br>2.2<br>4.1<br>4.2 |
| 6 N | ▭▭▭▭▭▭ | 1.1<br>2.1<br>2.2<br>4.1<br>4.2<br>4.3 |
| 7 N | ▭▭▭▭▭▭▭ | 1.1<br>2.1<br>2.2<br>4.1<br>4.2<br>4.3<br>4.4 |

| N \ Block Size | 2 | 4 | 8 | 16 | 32 | 64 | 128 | 256 | 512 | 1024 | 2048 | 4096 | 8192 | 16384 | 32768 |
|---|---|---|---|---|---|---|---|---|---|---|---|---|---|---|---|
| 2 | 2 | 8 | 7 |   | 7 | 7 |   | 15 | 7 |   |   | 15 |   |   |   |
| 4 |   |   | 8 | 4 |   | 7 |   | 15 | 7 |   |   | 15 |   |   |   |
| 8 |   |   |   |   | 7 | 7 |   |   | 7 |   |   | 15 |   |   |   |
| 16 |   |   |   |   | 8 |   | 8 | 15 |   | 7 |   | 15 |   |   |   |
| 32 |   |   |   |   |   | 8 |   | 16 | 8 |   |   | 15 |   |   |   |
| 64 |   |   |   |   |   |   |   |   |   | 8 |   | 15 | 7 |   |   |
| 128 |   |   |   |   |   |   |   |   |   |   | 32 | 15 |   |   |   |
| 256 |   |   |   |   |   |   |   |   |   |   |   | 16 | 8 |   |   |
| 512 |   |   |   |   |   |   |   |   |   |   |   |   |   |   |   |
| 1024 |   |   |   |   |   |   |   |   |   |   |   |   |   |   |   |
| 2048 |   |   |   |   |   |   |   |   |   |   |   |   |   | 4 |   |
| 4096 |   |   |   |   |   |   |   |   |   |   |   |   |   |   |   |
| 8192 |   |   |   |   |   |   |   |   |   |   |   |   |   |   |   |
| 16384 |   |   |   |   |   |   |   |   |   |   |   |   |   |   |   |
| 32768 |   |   |   |   |   |   |   |   |   |   |   |   |   |   | 2 |

SYSTEM AND METHOD FOR SIGNAL PROCESSING USING AN IMPROVED CONVOLUTION TECHNIQUE

TECHNICAL FIELD OF THE INVENTION

This invention relates generally to the field of digital signal processing, and more particularly to a system and method for signal processing using an improved convolution technique.

BACKGROUND OF THE INVENTION

Digital filters are often important components of digital signal processors (DSPs). A common type of digital filter is a finite impulse response (FIR) filter that processes an input signal by convolving the input signal with the filter's impulse response. This convolution may be performed using various methods. One method involves direct convolution. Direct convolution has no inherent latency, but its computational cost is often unacceptably high when long convolutions are to be computed in real-time. If computations were instantaneous, each sample input to the direct convolution algorithm would yield a convolved output sample. Therefore, the input to output latency inherent in the convolution algorithm structure is null. The actual latency of direct convolution results from the time necessary to compute each output sample. If the convolving filter is relatively short, the computation time is smaller than the sample period, and thus the latency is of only one sample. However, the computational cost of direct convolution increases linearly with the length of the convolving filter, which makes this technique unsuitable for performing long convolutions (thousands of sampling points) in real-time.

The cost problem may be addressed using frequency domain block convolution. This computationally efficient technique is based upon the fact that the Fourier Transform of the convolution of two signals is equal to the product of the Fourier Transforms of each individual signal. The Fast Fourier Transform (FFT) algorithm may be used in this approach, and consequently the cost per sample of these convolution techniques increases logarithmically with the length of the convolving filter (the "block"), which keeps cost at a more acceptable level when dealing with long convolutions. This type of convolution method may be referred to as a "single-block" convolution.

However, block processing techniques have an inherent input to output latency equal to the length of the block since the input sample block must be full in order to start computing the output sample block. This makes this kind of algorithm unsuitable for performing long convolutions in real-time due to the high latency. For example, when rendering three-dimensional audio, a typical room response can be several seconds long, which is far above acceptable latency levels for real-time audio rendering.

An existing approach to achieve low input to output latency while keeping computational cost at an acceptable level is to section the convolving filter into shorter blocks and perform several frequency-domain block convolutions in parallel, one for each shorter block. The output is obtained by summing the delayed outputs of the shorter convolutions, according to the superposition principle. The block length is chosen according to a specified input to output latency. This type of convolution may be referred to as a "multiple-block" convolution. Multiple block convolution may use blocks of uniform or non-uniform size.

One or more of the previously described methods may be adequate for performing many digital signal processing tasks. However, as applications require increasingly fast and complex digital signal processing, new convolution methods are needed to meet these demands.

SUMMARY OF THE INVENTION

According to the present invention, disadvantages and problems associated with previous systems and methods for signal processing have been substantially reduced or eliminated.

According to one embodiment of the present invention, a system for signal processing using one or more filters includes a controller that partitions an impulse response of a filter into a plurality of impulse response blocks and calculates a Discrete Fourier Transform (DFT) of each impulse response block using a Fast Fourier Transform (FFT) algorithm. A processor coupled to the controller receives an input sample block including samples of a signal to be processed and receives the DFT of each impulse response block from the controller. The processor calculates a DFT of the input sample block using an FFT algorithm, performs a spectral multiplication of the DFT of the input sample block with the DFT of each impulse response block, overlap-adds the blocks resulting from each spectral multiplication to create an output spectral block, performs an inverse FFT on the output spectral block to create an output sample block.

The system and method of the present invention provide a number of important technical advantages. The present invention allows long convolutions to be computed with low input to output latency and minimal computational cost. The present invention is particularly well-suited for situations where long convolutions are to be computed in parallel and outputs of these convolutions are to be mixed. Such applications include three-dimensional audio rendering, audio effects (for example, sound reverberation), and surround sound or virtual surround sound technologies. The present invention may be used for any application that involves the use of convolution techniques, including but not limited to graphics or video processing.

Applications requiring long convolutions often use computationally expensive FIR filters in a parallel structure. For example, in three-dimensional audio rendering, each parallel FIR branch models an acoustic path (either a direct path or a reflection) that exists between a source and a virtual listener. The combination of these filters requires long convolutions (often thousands of sampling points), such that previous convolution methods are either too computationally expensive or introduce too much latency for use in real-time audio or video rendering. These previous methods typically either reduce computational cost at the expense of unacceptably high latency (for real-time applications) or they reduce latency at the cost of unacceptably high computational cost. The present invention provides a convolution technique that optimizes the tradeoff between latency and computational cost so as to allow for minimum-cost convolution, while satisfying latency requirements of real-time applications. Other technical advantages are readily apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which:

FIG. 1 illustrates a long filter response and an equivalent parallel structure of short filter responses;

FIG. 2 illustrates the computational cost of a multiple-block convolution as a function of the number of samples per block;

FIG. 14 illustrates an exemplary table of the possible states for a pointer position used in conjunction with an optimal partition finding process;

FIG. 15 illustrates an exemplary graphical representation of the possible states at each pointer position of FIG. 14;

FIG. 18 illustrates exemplary output of an optimal partition finding process.

DETAILED DESCRIPTION OF THE INVENTION

Figure 3:
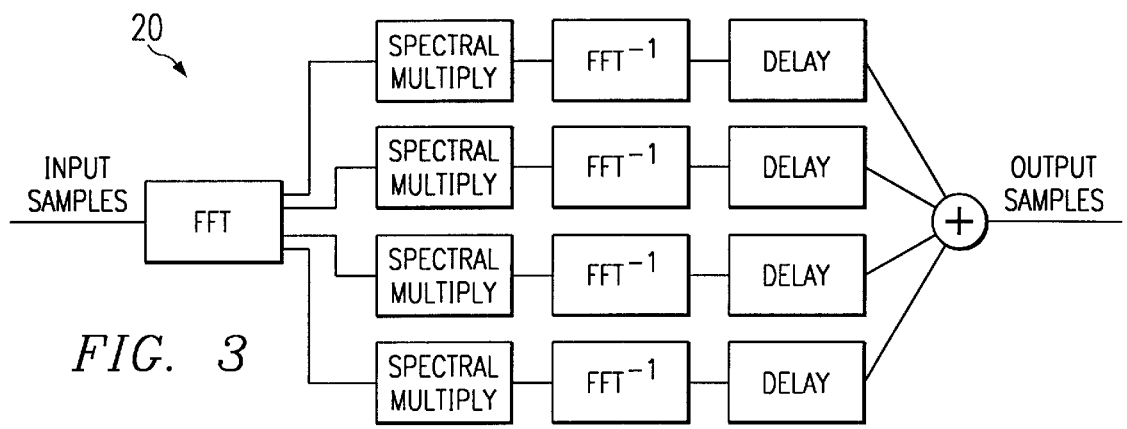
FIGS. 3 and 4 illustrate exemplary block structures of multiple-block convolution and frequency-domain delay line (FDL) convolution, respectively.

As described above, several previous methods for performing convolutions may be used, and each of these methods has an associated computational cost and latency. In order to provide a foundation for the present invention, this description will first evaluate the cost and latency associated with direct, single-block, and multiple-block convolution. The description will then describe the present invention and its advantages over the prior convolution techniques.

Direct Convolution

The cost of direct convolution can easily be evaluated from the convolution formula, which consists of an inner-product (for example, a transversal finite impulse response (FIR) filter) between the filter impulse response and the time-reversed version of the input samples. For a filter impulse response of length N, the computation of one convolved sample requires N "multiply-adds" (commonly referred to as "madds"). A multiply-add is the combination of one multiplication and one addition.

Single-block Convolution

The two primary single-block convolution methods are the "overlap-add" and "overlap-save" methods. These methods are well known in the art. Each of these methods computes the Discrete Fourier Transform (DFT) on the input sample block, multiplies the DFT of the input block by the DFT of the impulse response, and inverse-transforms the resulting block to obtain a time-domain block of output samples. The DFT of the impulse response is typically pre-computed. This type of convolution is referred to as single-block convolution since a single DFT of the whole impulse response is used (the impulse response is not partitioned into smaller blocks).

To determine the computational cost of these methods, it will be assumed that the impulse response length N is an integer power of two (obtained by zero-padding the original impulse response if necessary), and that its DFT has been pre-computed using a Fast Fourier Transform (FFT) algorithm. The cost of the N-point real FFT algorithm is expressed as $k \cdot N \cdot \log_2(N)$, where k is a proportionality constant that depends on the particular FFT algorithm being used. In the following examples, a typical value of $k=3/2$ will be used.

For an impulse response having N points, both the overlap-add and overlap-save methods calculate FFT blocks of 2N points to prevent the output block from being time-aliased. However, both techniques generate output blocks of N points, since the window on the input signal slides N points at a time. The cost per output sample will be obtained normalizing by N. Therefore, the cost due to the direct FFT is:

$$\text{cost}(FFT) = \frac{(k)(2N)\log(2N)}{N} = 2k\log(2N) = 2k[1 + \log(N)] = 2k + 2k\log(N)$$

The resulting FFT block of N complex points is then multiplied by the FFT block of the impulse response. This requires N complex multiplications, which require 4N multiply-adds:

$$\text{cost}(\text{Spectral Multiply}) = \frac{4N}{N} = 4$$

The inverse FT (FFT$^{-1}$) on the resulting block has the same cost as the direct FFT in the input signal:

$$\text{cost}(FFT^{-1}) = k(2N)\log(2N) = 2k\log(N)$$

An additional cost of N adds (one add per sample) is necessary to overlap-add the first N-point half of the 2N-point output block, while the overlap-save technique just saves the second N-point half of the 2N-point output block (no add is necessary). Thus, the respective costs of the overlap-add and overlap-save techniques are:

$$\text{cost(Overlap-Add)} = \text{cost}(FFT) + \text{cost}(\text{Spectral Multiply}) + \text{cost}(FFT^{-1}) + \text{cost}(\text{Add}) = 4k + 4k\log(N) + 5$$

$$\text{cost(Overlap-Save)} = \text{cost}(FFT) + \text{cost}(\text{Spectral Multiply}) + \text{cost}(FFT^{-1}) = 4k + 4k\log(N) + 4$$

The cost of direct convolution is a linear function of N, whereas the cost of single-block convolution is a logarithmic function of N. It is important to note that for typical FFT algorithms, the linear and logarithmic curves cross somewhere between N=32 and N=64. Therefore, for values of N smaller than 64 points, direct convolution is computationally cheaper than block convolution. Using a typical value of k=3/2, the respective costs of overlap-save and direct convolution are:

for N=32 cost(Overlap-Save)=40 madds cost(Direct Convolution) 32 madds for N=64 cost(Overlap-Save)=46 madds cost(Direct Convolution)=64 madds

Multiple-block Convolution

The advantage of single-block convolution is its efficiency compared to direct convolution. However, single-block convolution has an inherent latency equal to the block length of the impulse response, and thus presents an input to output latency problem when convolving with long impulse responses. An existing approach to solve this problem is to split the impulse response into shorter blocks, to compute the shorter convolutions of the input for each block, and to sum the respective outputs. Before performing the sum, each output is delayed by an amount equal to the time offset of its respective block in the long filter response.

FIG. 1 illustrates a long impulse response 10 and an equivalent parallel structure 12 of short filter responses, obtained by splitting long impulse response 10 into shorter blocks 14. The impulse response of each parallel branch 18 in structure 12 is given by the associated shorter block 14. Each block 14 is followed (or preceded) by a delay 16 equal to the time offset of the corresponding block 14 in long impulse response 10. The basic method of this type utilizes uniform block partitions (all blocks 14 are of the same size). To evaluate the computational cost of this method, it is assumed that the impulse response 10 is partitioned into M blocks 14 of N samples each, where M is an integer and N is an integer power of two (the impulse response 10 can be zero-padded as necessary to satisfy this condition). Let T be the length of the impulse response 10, so that:

$$T = M \cdot N$$

The total cost is the sum of the individual costs of each block convolution, corresponding to each branch 18 in parallel structure 12.

As described above, FFTs of 2N real points are necessary when using the overlap-save method, and there are M branches 18. The direct FFT on 2N input samples is shared by all convolution branches 18, so only one input FFT is needed, requiring $2k \cdot [1+\log(N)]$ multiply-adds. Each branch 18 performs a spectral multiply of N complex points, including 4N real multiplies and 2N real adds, between the input spectrum and the filter frequency response. Each branch 18 then performs a 2N-point inverse FFT on the spectrum resulting from the multiply. The block of N samples resulting from the inverse FFT of each branch 18 is overlap-added to the output buffer with the corresponding delay, requiring N adds.

This process generates N output samples. The total cost per output sample of multiple-block convolution is as follows:

cost(Multiple-Block)=cost(FFT)+M·cost(Spectral Multiply)+ M·cost(FFT$^{-1}$)+M·cost(Overlap-Add)

or cost(Multiple-Block)=$2k[1+\log(N)]+4M+2kM[1+\log(N)]+M=2k(1+M)[1+\log(N)]+5M$ or cost(Multiple-Block)=$2k(1+T/N)[1+\log(N)]+5T/N$ FIG. 2 illustrates the cost (using a logarithmic scale) of multiple-block convolution as a function of N, for T=65,536 (or $2^{16}$) and k=3/2. This curve is meaningful only for values of N which are integer powers of two, due to the use of the FFT algorithm. For a given filter length T, the computational cost increases as N decreases. In other words, the more blocks 14 impulse response 10 is partitioned into (the smaller N is and the larger M is), the more expensive the convolution. The cost is minimum when there is no partition at all (when a single-block convolution is used). When impulse response 10 is partitioned into four blocks 14, the cost is about two and a half times the minimum cost. Therefore, splitting the impulse response 10 into shorter blocks 14 helps reduce the latency, at the price of increasing the computational cost.

Frequency-domain Delay Line (FDL) Convolution

At each input block cycle, each branch 18 of the multiple-block structure 12 illustrated in FIG. 1 performs a spectral multiply of the input block FFT by the filter frequency response (the FFT of the corresponding impulse response block 14), performs an inverse FFT on the multiplied spectrum, and overlap-adds its delayed sample block to the output buffer (which can be viewed as a delay line). Therefore, if there are M branches 18, M inverse FFTs need to be performed at each input block cycle. Since the block partition is uniform, all delays are integer multiples of the block size, which is an integer power of two. Therefore, the overlap-added sample blocks may be perfectly aligned; in other words, the output block of branch "n" at time "k" may have a complete overlap with the output block of branch "n–1" at time "k+1".

Therefore, in one embodiment, there is no need to overlap-add the branch outputs in the time-domain and thus no need to perform the inverse FFT on each branch before the overlap-add operation. Instead, the multiplied spectra of each branch can be overlap-added to the output buffer. At each input block cycle, only one output block of samples is needed. This block of samples is the one corresponding to the first FFT block in the output buffer, which will be referred to as a "frequency-domain delay line" since the data circulating through it is in the frequency domain.

Figure 4:
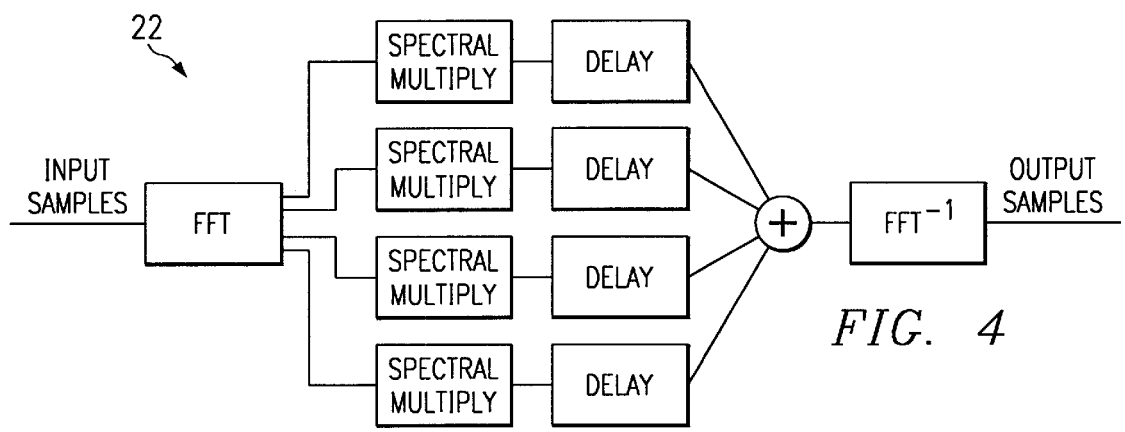

FIGS. 3 and 4 illustrate an exemplary block structure 20 for multiple-block convolution and an exemplary block structure 22 for frequency-domain delay line (FDL) convolution, respectively. Unlike block structure 20, only one inverse FFT needs to be computed per input block cycle using block structure 22. Therefore, block structure 22 for FDL convolution provides great computational savings over structure 20. Regardless of the number of blocks 14 into which the response 10 has been partitioned, only one direct and one inverse FFT are needed per output sample block when using FDL convolution and associated structure 22 (unlike multiple-block convolution using block structure 20). This represents a significant computational cost savings and provides an important technical advantage of the present invention.

The following equations show the computational cost of FDL convolution and compare it to that of multiple-block convolution. Again, it is assumed that impulse response 10 is partitioned into M blocks 14 of N samples each, where M is an integer and N is an integer power of two. Therefore, the length of the impulse response is:

$$T = M \cdot N$$

In one embodiment, the processing steps are as follows. The direct FFT on 2N input samples is shared by all convolution branches, so only one input FFT is needed, requiring 2k·[1+log(N)] multiply-adds. Each branch performs a spectral multiply of N complex points (4N real multiplies and 2N real adds) between the input spectrum and the filter frequency response. The block of N complex points resulting from the spectral multiply of each branch is overlap-added onto the output buffer (which is the frequency-domain delay line) with the corresponding delay, requiring 2N real adds. Therefore, this step includes 4N operations. One inverse FFT is then performed on the block heading the frequency-domain delay line. This process generates N output samples. The total cost per output sample of this process is as follows:

$$\text{cost}(FDL) = \text{cost}(FFT) + M \cdot \text{cost}(\text{Spectral Multiply-Add}) + \text{cost}(FFT^{-1})$$

or $$\text{cost}(FDL) = 2k \log(2N) + 4M + 2k \log(2N) = 4k + 4k \log(N) + 4M$$

or $$\text{cost}(FDL) = 4k + 4k \log(N) + 4T/N$$

Figure 5:
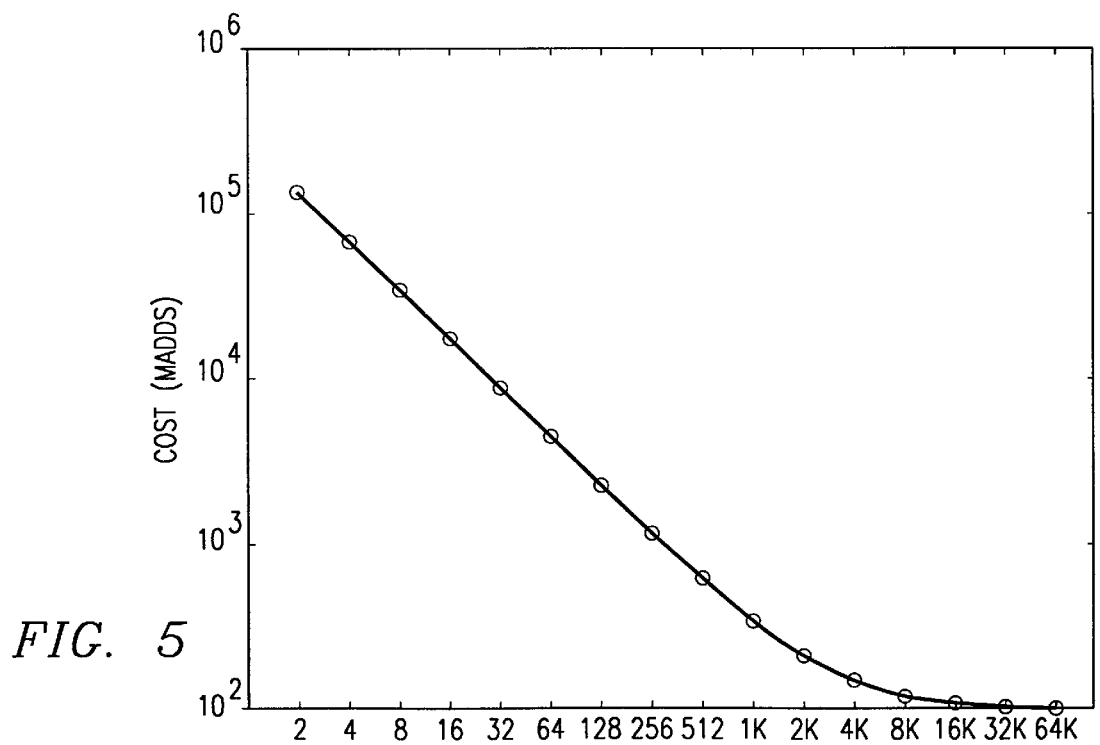
FIG. 5 illustrates the computational cost of FDL convolution as a function of the number of samples per block.

FIG. 5 illustrates the computational cost of FDL convolution as a function of N, where T=65,536 and k=3/2. Due to the use of the FFT algorithm, this curve is meaningful only for values of N which are integer powers of two. For a given filter length T, the computational cost of FDL convolution does not vary monotonically, but has a minimum at a value of N which is smaller than T. There exists an optimal block length for the uniform partition, which is generally (depending on the value of k) smaller than T. In other words, the basic block convolution with N=T is not optimal, and there exists a value of N smaller than T for which the convolution is computationally cheaper using the FDL convolution technique.

Figure 6:
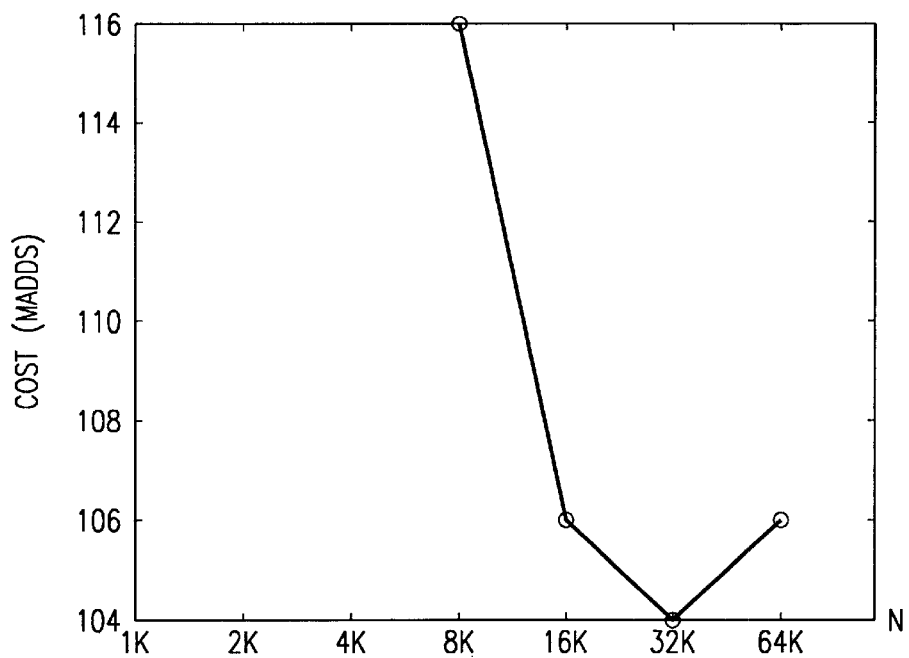
FIG. 6 illustrates the computational cost of FDL convolution in greater detail.

FIG. 6 illustrates the cost (using a linear scale) of FDL convolution as a function of N in greater detail. For N=T, FDL convolution is equivalent to single-block convolution. In one embodiment, regardless of the block length N, FDL convolution performs only one direct and one inverse FFT per output sample block. As the block length N decreases, the cost of the FFT algorithm decreases since shorter FFTs are computed. However, the cost of the spectral multiply-adds increases since the number of blocks M increases. For values of N starting at T and decreasing, the FFT cost is the dominant cost component and the curve approaches a minimum (at which N is optimal). If N continues to decrease beyond its optimal value, the cost of the spectral multiply-adds becomes the dominant cost component and the total cost grows significantly.

The following equations may be used to determine the value of N for which the curve is minimum. The cost function of N is as follows:

$$\text{cost}(FDL) = 4k + 4k \log(N) = 4T/N = 4k + 4k \ln(N)/\ln(2) + 4T/N$$

Setting the derivative of the cost with respect to N to zero, the following expression is obtained:

$$\frac{d\{\text{cost}(FDL)\}}{dN} = \left(\frac{4k}{\ln(2)}\right)\left(\frac{1}{N}\right) - \frac{4T}{N^2} = 0$$

Solving for N:

$$N = \frac{\ln(2)}{k} \cdot T = \frac{0.6931}{k} \cdot T$$

For a typical value of k=3/2, the optimal block length, N, is equal to 0.462 T, which yields N=30,284 if T=65,536. However, only values of N which are integer powers of two are meaningful. Therefore, either N=16,384 ($2^{14}$) or N=32,768 ($2^{15}$) should be chosen. By inspection of the curve plot of FIG. 6, it is clear that N=32,768 provides the minimum cost. Therefore, in one embodiment the minimum cost of FDL convolution is as follows:

$$\text{cost}(FDL) = 6 + 6\log(32,768) + \frac{4 \cdot 65,536}{32,768} = 104 \text{ madds}$$

In comparison, the cost of the basic overlap-save method where N=T=65,536 is as follows:

$$\text{cost}(\text{overlap-save}) = 6 + (6 \cdot 16) + 4 = 106 \text{ madds}$$

Figure 7:
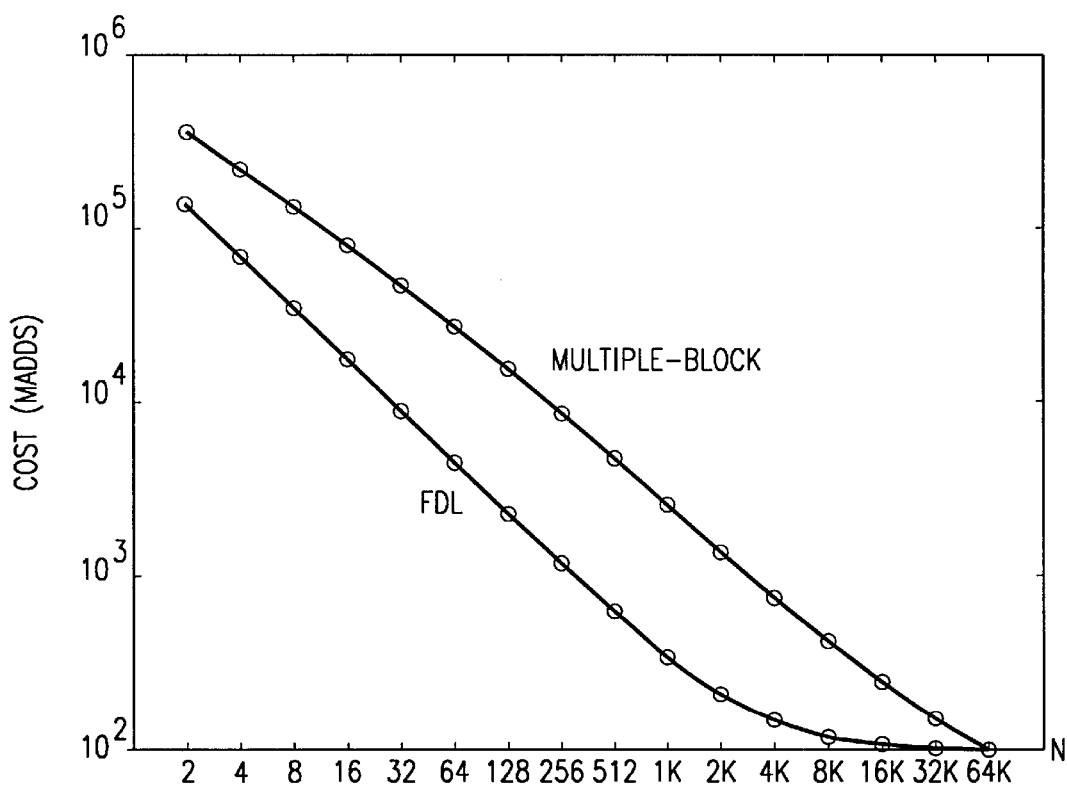
FIG. 7 illustrates the computational cost as a function of the number of samples per block for multiple-block convolution and for FDL convolution.

Therefore, for k=3/2, FDL convolution is slightly cheaper than single-block convolution. If the available FFT algorithm is less efficient (k>3/2), then FDL convolution can be considerably cheaper. Furthermore, a slightly higher computational cost would in many cases still be desirable in exchange for smaller input to output latency. In terms of latency, FDL convolution performs better than multiple-block convolution, which is the next best convolution technique in terms of latency. FIG. 7 illustrates the computational cost as a function of N of both FDL convolution and multiple-block convolution for k=3/2 and T=65,536.

When many independent convolutions are computed in parallel and their outputs are mixed, as is the case in three-dimensional audio applications when several acoustic sources are rendered, the efficiency improvement of FDL convolution with respect to multiple-block convolution is even greater. This is at least in part because the mixing can be performed in the frequency domain when using FDL convolution. Therefore, instead of computing an inverse FFT for each source, only one inverse FFT is computed after the outputs of the sources are mixed. In this case, each convolver performs a direct FFT on its input block, followed by the spectral multiply-add onto the output buffer. Then, no inverse FFT is performed by the convolver, but the spectral N-complex-point block heading the FDL is communicated to a mixer or other appropriate destination, which adds all incoming spectral blocks and performs one inverse FFT on the result to obtain the output samples. The cost of the inverse FFT is thus spread among all convolvers in parallel.

In this scenario, the mixer is mixing spectral blocks of N complex points (2N adds) rather than sample blocks of N real points, so there is one additional operation per output sample of the mixer. However, this is an insignificant additional cost since this one operation is also spread among all convolvers in parallel, and therefore it is ignored in the following cost calculations. For example, if ten T-point convolutions were performed in parallel, the cost per output sample of each convolver would be:

$$\mathrm{cost}(FDL) = 2k\,\log(2N) + 4M + (1/10)2k\,\log(2N)$$

or $$\mathrm{cost}(FDL) = 2.2k + 2.2k\,\log(N) + 4T/N$$

Figure 8:
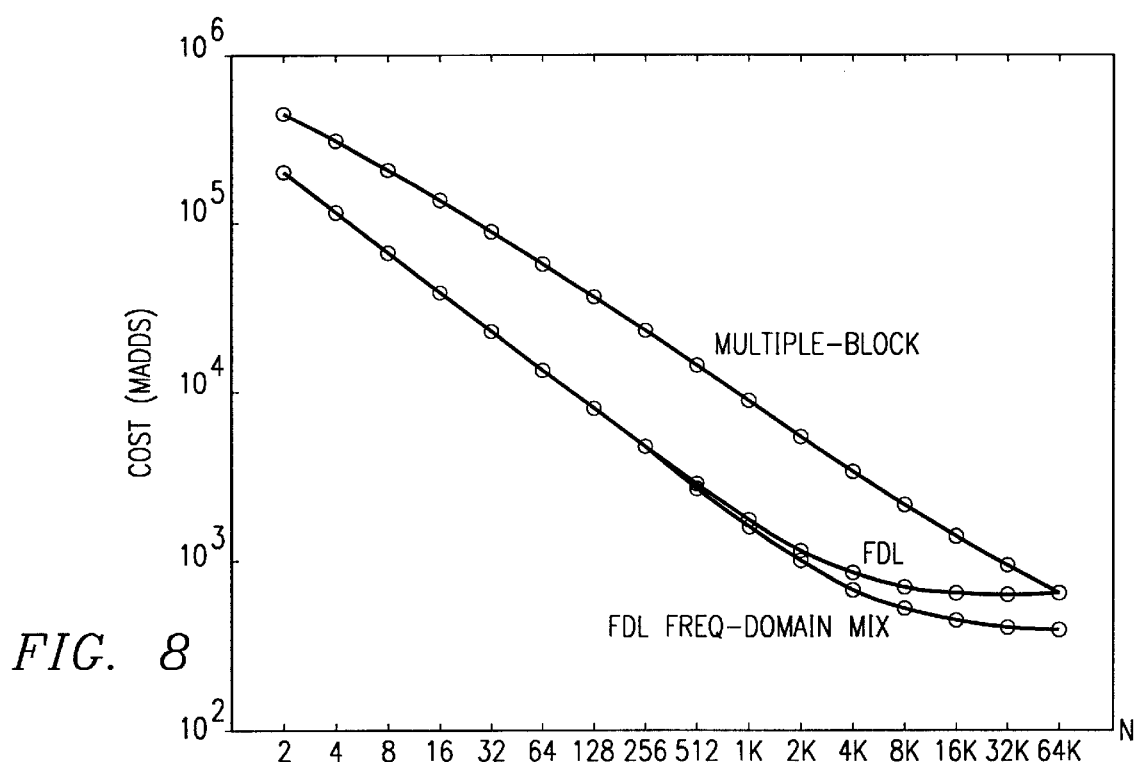
FIG. 8 illustrates the computational cost as a function of the number of samples per block for multiple-block convolution, FDL convolution with mixing in the time domain, and FDL convolution with mixing in the frequency domain.

FIG. 8 illustrates the computational cost as a function of N for multiple-block convolution, FDL convolution with mixing in the time domain, and FDL convolution with mixing in the frequency domain (when ten convolutions are performed in parallel). For values of N smaller than 256, the cost of the spectral multiply-adds (the component "4T/N") is the dominant cost component and thus FDL convolution with frequency-domain mixing is not significantly cheaper than FDL convolution with time-domain mixing. However, for values of N>512, FDL convolution with frequency-domain mixing is significantly cheaper.

Dual-FDL Convolution

The FDL convolution method performs better than the multiple-block method, but its cost curve still grows significantly when N becomes small compared to its optimal value. Often input to output latency (and thus the block length N) are required to be relatively short, and in those conditions FDL convolution is not optimal. For example, if the latency specification requires a block length of N=128 and the filter length were T=65,536, then the cost would be 2,096 multiply-adds, whereas the cost for an optimal block size (N=32,768) is only 104 multiply-adds. The problem is that, due to the latency specification, N is made too small compared to the optimal N and the cost of the spectral multiply-adds dominates the total computational cost. Therefore, the FDL convolution method is wasting its computational power in order to satisfy the latency requirement.

The cost of multiple-block convolution using uniform partitions also increases significantly when a small block length is used. One solution that has been suggested to lower the cost of multiple-block convolution is to use non-uniform partitioning, with blocks of increasing size. However, this solution would not work with FDL convolution, since FDL convolution uses uniform partitions to take advantage of the FDL by overlapping FFT blocks to reduce the number of inverse FFTs. More efficient FDL convolution may be obtained by partitioning the impulse response 10 into a header FDL of short blocks to satisfy the latency requirement, followed by a second FDL of longer blocks to keep the cost at a relatively low level (by preventing the spectral multiply-adds from dominating the cost calculation).

Figure 9:
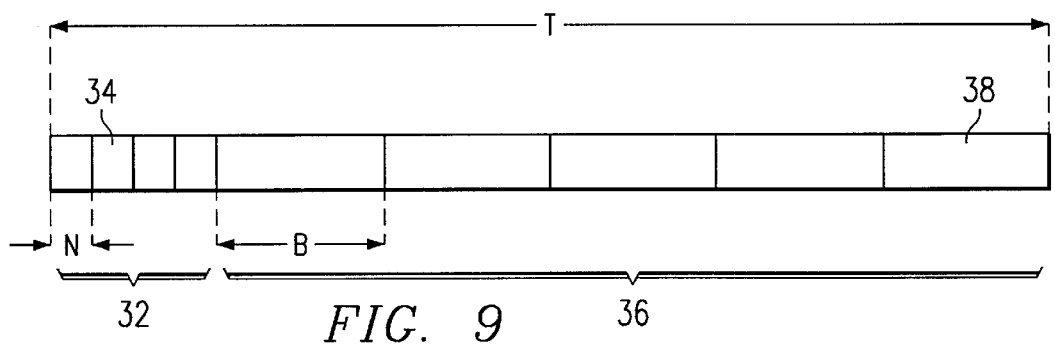
FIG. 9 illustrates an exemplary dual-FDL convolver partitioning.

FIG. 9 illustrates such dual-FDL convolver partitioning. The header FDL 32 is composed of blocks 34 of N samples each, where N is specified by the latency specification. The second FDL 36 is composed of blocks 38 of B samples each, where B is a variable selected to optimize the convolution process. As described below, in one embodiment a value of B is determined for which the computational cost is minimum. B is constrained to be an integer multiple of N, and T can be made an integer multiple of B by zero padding if necessary.

The cost of header FDL 32 is:

$$\mathrm{cost}(FDL_1) = 4k\,\log(2N) + 4B/N$$

The cost of second FDL 36 is:

$$\mathrm{cost}(FDL_2) = 4k\,\log(2B) + 4[(T/B)-1]$$

since there are [(T/B)−1] blocks 38 of B samples in second FDL 36.

The total cost of the dual-FDL convolution is the sum of these individual costs:

$$\mathrm{cost}(\mathrm{Dual}\text{-}FDL) = 4k\,\log(2N) + 4B/N + 4k\,\log(2B) + 4[(T/B)-1]$$

The value of B can be chosen so as to minimize cost, and N is specified by the latency specification. Both N and B take discrete values since they are constrained to be integer powers of two. The optimal value of B can be determined by setting to zero the derivative of the cost with respect to B, as if B were a continuous variable, and then selecting the discrete value of B adjacent the optimal continuous value, for which cost is minimum. This calculation is performed as follows:

$$0 = \frac{4}{N} + \frac{4k}{B\ln(2)} - \frac{4T}{B^2}$$

or $$0 = (N \cdot B^2) + \left(\frac{k}{\ln(2)} \cdot B\right) - T$$

There are two solutions for this quadratic expression of the continuous optimal value of B:

$$B = -\frac{kN}{2\ln(2)} + \sqrt{\left(\frac{kN}{2\ln(2)}\right)^2 + NT}$$

$$B = -\frac{kN}{2\ln(2)} - \sqrt{\left(\frac{kN}{2\ln(2)}\right)^2 + NT}$$

Only the first of these expressions yields a meaningful solution for B, since the second one gives a negative value. Furthermore, even though N and B are treated as continuously variable values, only values which are integer powers of two are meaningful, due to the use of the FFT algorithm. Therefore, to find the actual optimal value of B, the cost is evaluated at the two discrete points (which are integer powers of two) around the optimal continuous B, and the value for B is chosen for which the cost is minimum.

Figure 10:
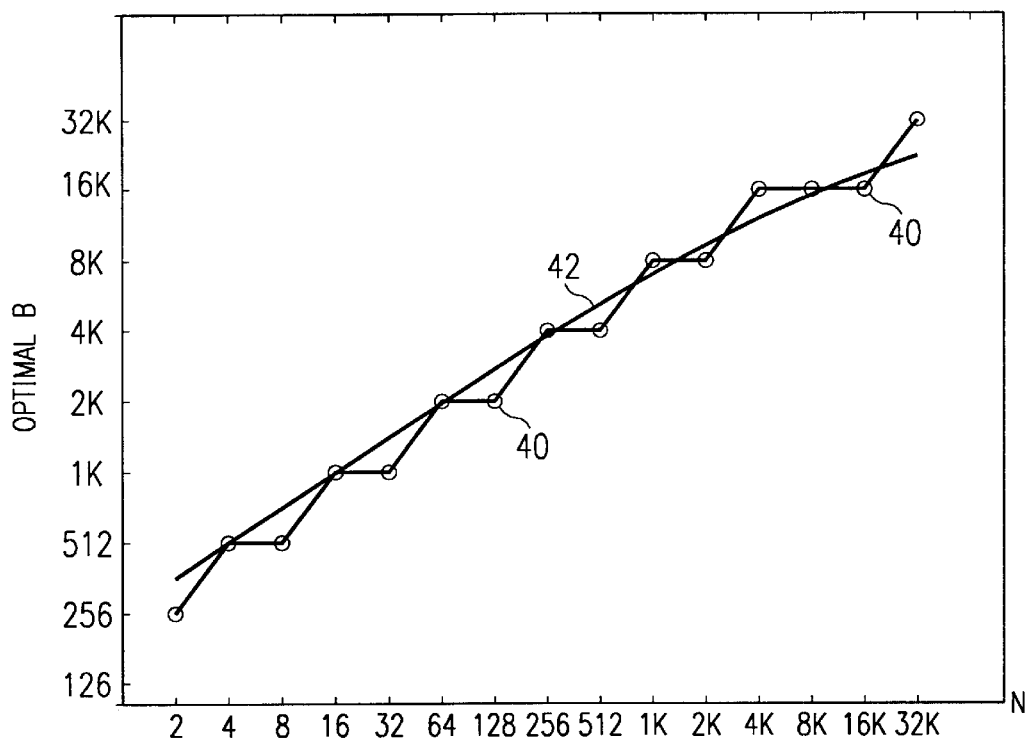
FIG. 10 illustrates exemplary points where the second FDL sample size of the partition of FIG. 9 is optimal for a given number of samples per block.
Figure 11:
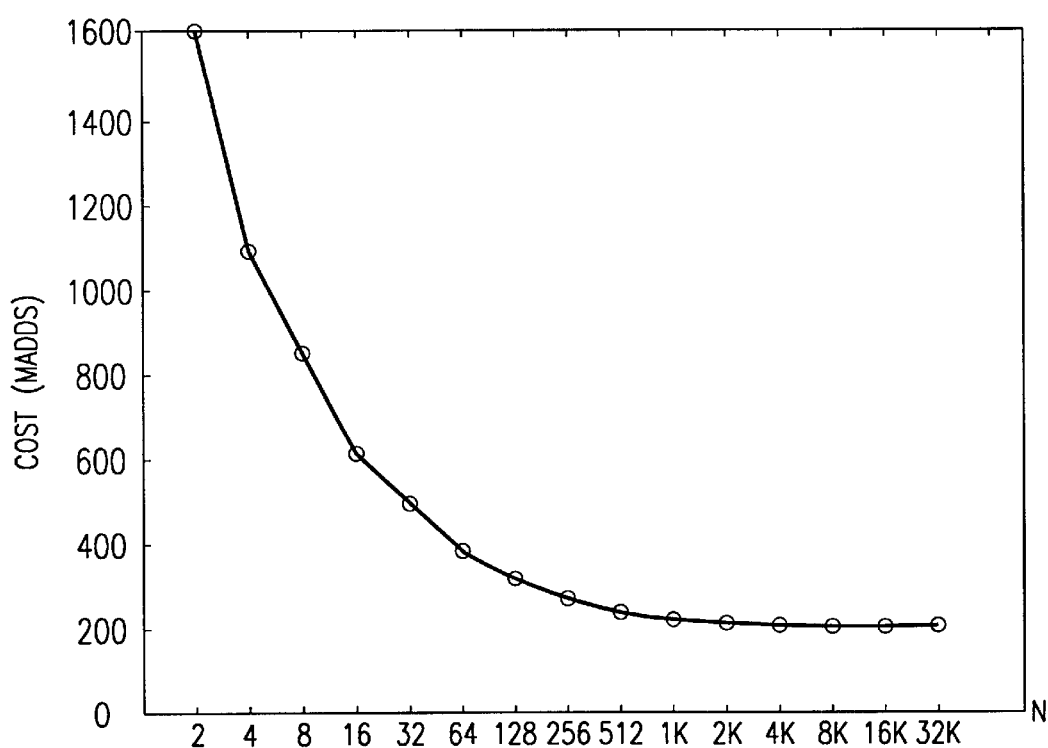
FIG. 11 illustrates the computational cost of dual-FDL convolution as a function of the number of samples per block.

FIG. 10 illustrates the points 40 where B is optimal as a function of N for T=65,536. In addition, a curve 42 of the optimal continuous B is also illustrated for reference. The cost of the dual-FDL convolution can then be evaluated for each value of N, replacing B in the cost expression by its optimal value. FIG. 11 illustrates the cost of dual-FDL convolution as a function of N for k=3/2 and T=65,536 using the optimal values of B.

Figure 12:
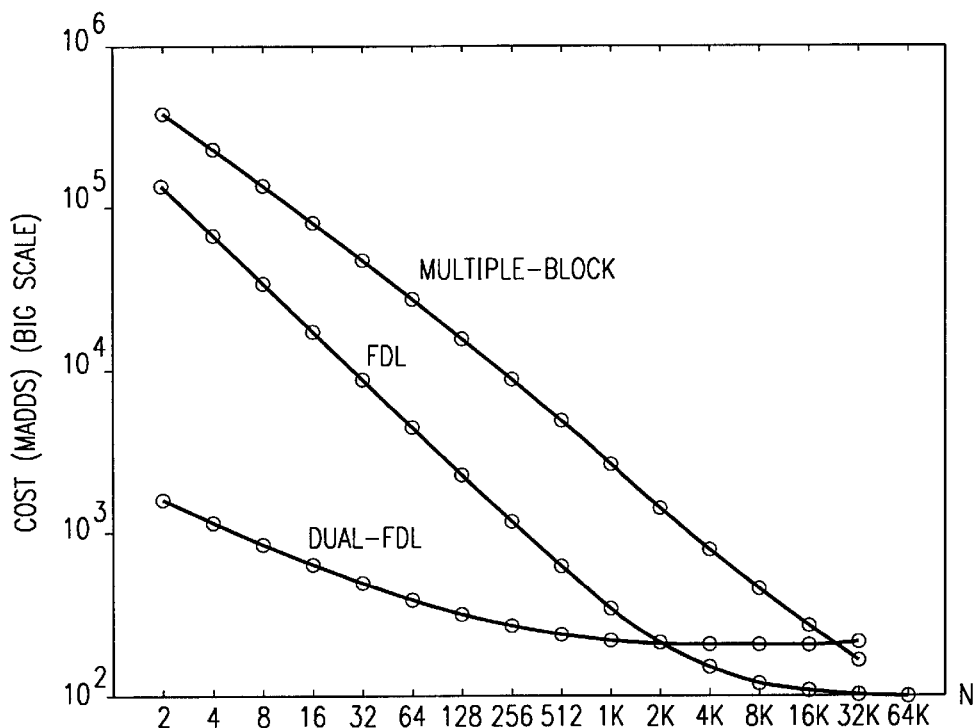
FIG. 12 illustrates the computational cost of multiple-block, single-FDL, and dual-FDL convolution as a function of the number of samples per block.

FIG. 12 illustrates the cost of dual-FDL, single-FDL, and multiple-block convolutions as a function of N, for T=65,536 and k=3/2. This figure clearly shows that dual-FDL convolution achieves the goal of keeping cost at a lower level than the other two convolution techniques when low latency (a small value of N) is desired. For values of N up to 1,024, dual-FDL convolution performs better than single-FDL convolution. In particular, for values of N smaller than 1,024 it performs significantly better. For N greater than 2,048, single-FDL convolution outperforms dual-FDL convolution, but large values of N result in long input and output latencies, which are unacceptable for many real-time applications such as real-time audio or video applications. Dual-FDL convolution successfully flattens out the computational cost curve for lower values of N. In summary, the cost/latency ratio is improved by using two FDLs: one to satisfy the latency requirement and the other to minimize cost.

Multiple-FDL Convolution

In dual-FDL convolution, the first FDL satisfies the latency requirement and the second FDL minimizes the cost.

Therefore, dual-FDL convolution minimizes the cost given its inherent constraint that only two FDLs are used. The present invention expands the dual-FDL concept by partitioning the impulse response into more than two FDLs, with the first FDL satisfying the latency specification. This leads to a multiple-FDL convolver that can attain lower computational costs with lower latency than the previously-described convolution techniques.

Figure 13:
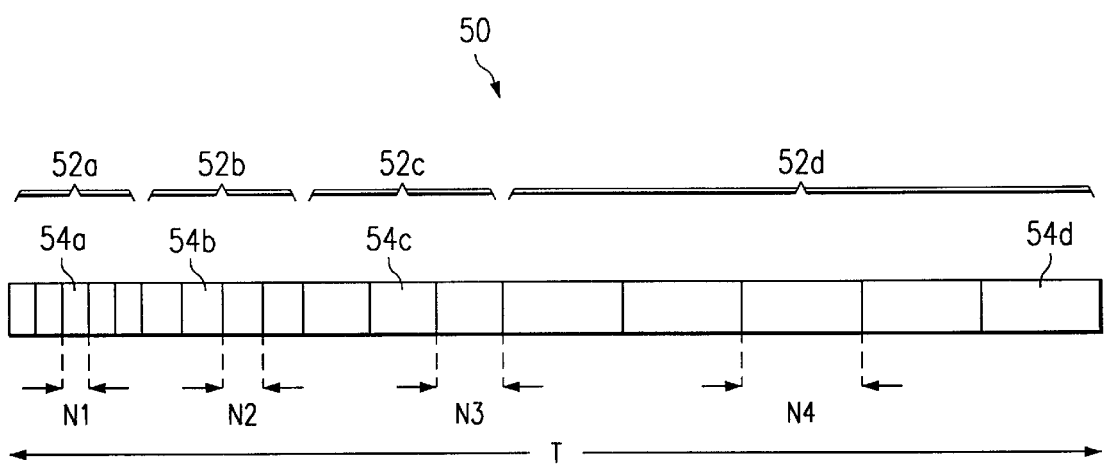
FIG. 13 illustrates an exemplary partition of a filter response into four FDLs.

FIG. 13 illustrates exemplary partitioning of an impulse response 50 of length T into four FDLs 52a–52d that include blocks 54a–54d, respectively, having block lengths of N1, N2, N3 and N4. In one embodiment, the block length of blocks 54 in a given FDL 52 may be any integer-power-of-two multiple of the block length of the preceding FDL 52. Also, an FDL 52 may have any appropriate number of blocks 54. For a given filter length and latency specification, the following variables are chosen: the number of FDLs 52 into which impulse response 50 is partitioned, the block length of each FDL 52 (except perhaps the first one, which may be determined according to the latency specification), and the number of blocks 54 included in each FDL 52. As described more fully below, the present invention provides a method to determine the values of these variables that minimize the computational cost, given the latency specification (which determines N1) and the filter length T.

Optimal Partition Finding Technique

The optimal-partition finding technique of the present invention uses dynamic programming to automatically find the block partition that minimizes the total computational cost of multiple-FDL convolution. The following reasoning lays the foundation for the process. For this description, it is assumed that the filter impulse response is T samples long and that the latency specification specifies that the block size N1 of FDL 52a is N samples. If a pointer is moved through the filter impulse response with a step of N samples, starting with the first sample, the pointer will fall at positions which are integer multiples of N. At each position of the pointer, all possible "states" of the partition will be described. The state may be defined by the following two parameters for a given pointer position: the size of the block 54 the pointer falls within (for example, a block of 4N points), and the fraction of the block 54 to which the pointer points. Since the pointer advances with a step of N samples, it can point to the beginning or to some intermediate fraction of a block. For example, the pointer may point to the third quarter of a 4N-point block.

The following four constraints are imposed in this example to determine the possible states and the possible transitions between states. First, the block sizes must be integer powers of two. Second, a block 54 of size S cannot start with an offset smaller than S with respect to the beginning of the filter impulse response. For example, a 1024-point block 54 cannot start before the 1024th sample of the filter impulse response 50. Therefore, states with block sizes equal to or greater than S cannot exist at pointer positions smaller than S. Third, a block 54 of size S cannot be followed by a block 54 having a size smaller than S. It must be followed by a block 54 of size equal or greater than S. The block size of the following block 54 can be the product of S and any power of two. Thus, states with a block size equal to S cannot transition into states of block size smaller than S. Fourth, when the pointer falls on a fraction of a block 54 which is not the last fraction of the block 54, there is only one possible state that may follow. This following state is the state where the pointer points to the next fraction of the block 54. For example, a state with block size 4N and in which the pointer is on the second quarter of the block must necessarily transition into the state with the same block size and where the pointer is on the third quarter of the same block 54.

FIG. 14 illustrates an exemplary table 60 of the possible states for each pointer position 62, where each state is characterized by a block size 64 and the fraction 66 of the block 54 to which the pointer points. In this example, the filter 50 is assumed to have a length of T=8N samples. The notation used to identify states is as follows: a state ID 68 having the notation "(S.Q)" indicates that the pointer falls on the Qth fraction of a block containing S fractions. Since the fractions are of size N, a block 54 having S fractions has a size of S·N. FIG. 15 illustrates an exemplary graphical representation 70 of the possible states (with state IDs 72) at each pointer position 74. Filter 50 is again assumed to have a length of T=8N samples.

Figure 16:
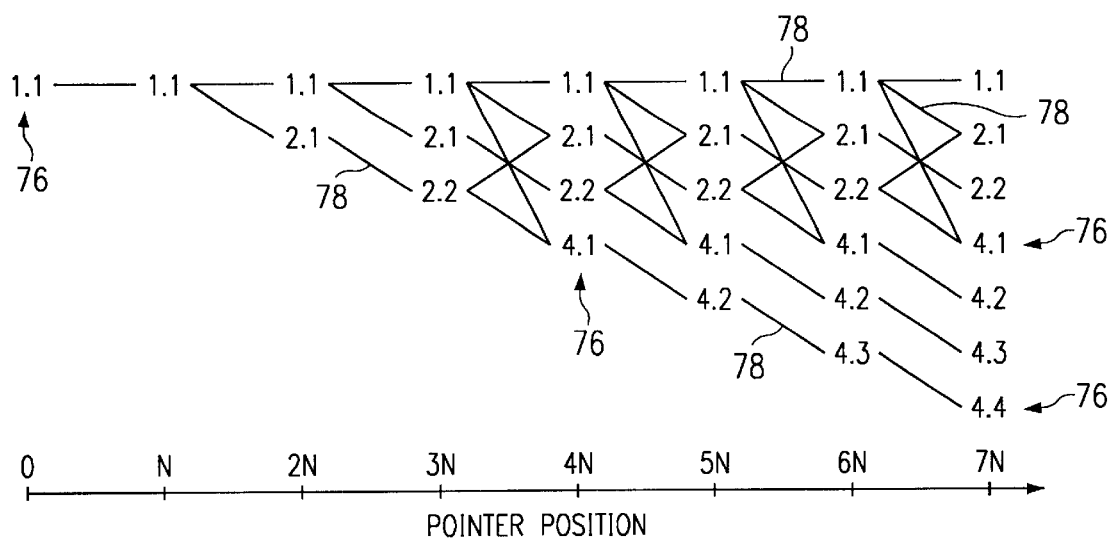
FIG. 16 illustrates the exemplary states and the possible state transitions for each pointer position of FIG. 14.

FIG. 16 illustrates the exemplary states 76 and possible state transitions 78 for each pointer position 74. Each state transition is associated with a computational cost. A transition 78 into a block of greater size, that is from a (X.X) state 76 into a (Y.1) state 76, where Y>X, is a transition 78 into a new FDL 52. Therefore, its associated cost is the cost of one FFT, one inverse FFT, and one spectral multiply-add, and may be calculated as follows:

$$\mathrm{cost}(X.X \rightarrow Y.1; Y>X) = 4k\log(2YN)+4$$

If multiple convolutions are performed in parallel and their outputs mixed, this state transition 78 has a lower cost since the inverse-FFT is performed by the mixer and thus the cost is spread over all the convolvers in parallel. If P convolutions are performed in parallel, the cost may be calculated as follows:

$$cost(X.X \rightarrow Y.1; Y>X) = \left(2 + \frac{2}{P}\right)k\log(2YN) + 4$$

Furthermore, when a block 54 is followed by a block 54 that is twice as long, significant optimization can be achieved by using the previously computed half-sized spectra. This reduces the FFT cost by a factor slightly less than two. For simplicity, the following cost analysis assumes that this factor is equal to two. Therefore, if the transition 78 is made to a block 54 twice as long as the current block 54, the cost of the transition 78 is:

$$\mathrm{cost}(X.X \rightarrow Y.1; Y=2X) = 3k\log(2YN)+4$$

However, for most cases the cost savings of using previously computed half-sized spectra does not have a large amount of influence on the cost, and often the optimal partition does not include transitions 78 to blocks 54 twice as long (but four times as long or greater). In other words, optimal partition finding according to the present invention will choose the same partition with or without the option of using previously computed half-sized spectra.

A transition into a block 54 of equal size, that is from (X.X) state 76 to (X.1) state 76, means that one more block is added to the current FDL. Therefore, the associated cost of this transition 78 is the cost of one spectral multiply-add:

$$\mathrm{cost}(X.X \rightarrow X.1) = 4$$

A transition 78 from a fraction of a block 54 into the subsequent fraction of a block 54, for example, from (X.1) state 76 to (X.2) state 76, has no associated cost.

For a long impulse response 50 and a low latency, there are a large number of possible partitions and thus a large number of possible state sequences. The use of dynamic programming techniques is an efficient way to determine the sequence of states 76, and thus the partition, for which the computational cost is minimum. The use of dynamic programming techniques is well known in the art and will not be described in detail. In short, the well-known Viterbi algorithm may be used to find the optimal state sequence, the algorithm evaluating (for each state 76 at a given pointer position) the state sequence that leads to the present state 76 with the minimum computational cost. When the pointer reaches the end of impulse response 50, the algorithm finds the optimal state sequence by backtracking through the past partially-optimized sequences. The optimal state sequence corresponds to the partitioning of impulse response 50 into multiple FDLs 52 that results in the lowest computational cost.

Figure 17:
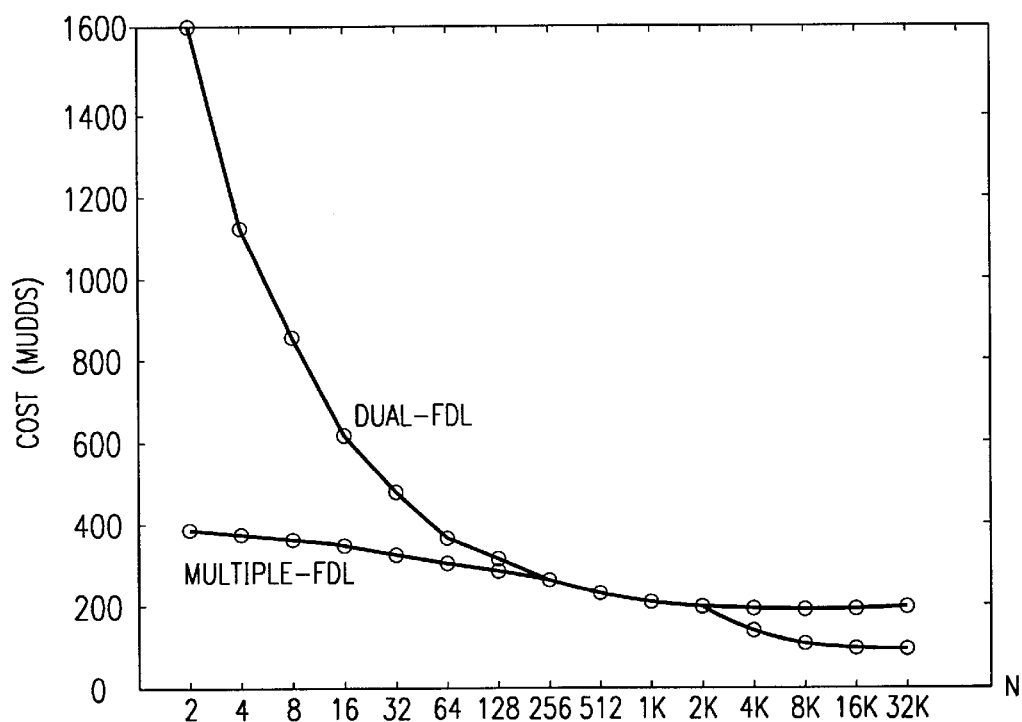
FIG. 17 illustrates the computational cost as a function of the number of samples per block for multiple-FDL and dual-FDL convolution.

FIG. 17 illustrates the computational cost as a function of latency (N) of multiple-FDL convolution as compared to dual-FDL convolution for T=65,536. For N=256 to N=2,048, the costs of the two convolution techniques are the same since the dual-FDL partition is the optimal partition determined by the optimal partition finding technique. For N>2,048, the uniform partition is the optimal partition, and thus dual-FDL convolution is about twice as expensive. For N<256, the optimal partition is relatively non-uniform and thus multiple-FDL convolution performs significantly better than dual-FDL convolution. Therefore, for low-latency convolutions (low values of N), multiple-FDL convolution is the most efficient.

FIG. 18 illustrates an exemplary table 80 of the output of optimal partition finding for a filter length of T=65,536 points and k=3/2. Each row corresponds with a particular value of N (the latency), indicated in column 82. Each column corresponds with a particular block size, indicated in row 84. The numbers included in the table 80 indicate the number of blocks 54 of each relevant block size that form an optimal partition for a particular N. For example, in one embodiment, the optimal partition for a latency of N=16 is a sequence of four FDLs 52, where the first FDL 52 includes four 16-point blocks 54, the second FDL 52 includes seven 64-point blocks 54, the third FDL 52 includes seven 512-point blocks 54, and the fourth FDL 52 includes fifteen 4096-point blocks 54.

In some situations, in three-dimensional audio rendering for example, the filter impulse response 50 may have "gaps" or segments where impulse response 50 is zero. For example, this may be the case when the filter models low-order reflections of a large acoustic room where there may be a significant amount of time between reflections. During the time between reflections, the impulse response 50 of the room is null. This creates a significant waste of computing power, since many of the samples would be convolved by zeros.

However, the flexibility of the optimal partition finding technique allows this problem to be addressed by adding an additional rule for state transitions 78. In one embodiment, if a state transition 78 is made to a state 76 whose corresponding block 54 falls on a null part of the impulse response 50, then the spectral multiply-add cost is subtracted from the cost of this transition 78 since this operation will not be necessary. Therefore, the optimal partition finder is able to take into account the gaps of the impulse response 50 when finding the optimal partition. However, this strategy may not be effective when finding a common optimal partition for multiple parallel convolvers, since the gaps are usually at different places of each convolver's impulse response 50.

Furthermore, if null latency is desired, a header block may be appended at the beginning of the filter partition and convolved using the direct-form convolution. This strategy can be utilized for any block convolution technique, and its effect on the total cost is the same—a constant term equal to the cost of direct convolution for the header block is added to the cost curve.

The present invention, using multiple-FDL convolution and optimal partition finding as described above, is more efficient than previous methods for long convolution having low latency. When multiple convolutions are performed in parallel and their outputs are mixed, the present invention outperforms previous convolution methods by an even greater factor, which increases with the number of multiple convolvers. This is at least in part because FDL-based convolution allows the mixing to be done in the frequency domain, significantly reducing the number of inverse FFTs required as compared to other convolution methods. The large reduction in the number of inverse FFTs is accomplished using a frequency-domain delay line (FDL), which in one embodiment requires only one direct and one inverse FFT per block of output samples.

Furthermore, the way in which the filter impulse response 50 is partitioned into different FDLs 52 with different block sizes also has a substantial effect on computational cost. The number of possible partitions can be very large for long impulse responses 50, and thus the partition that minimizes computational cost may be extremely difficult to determine by inspection. Therefore, the present invention includes optimal partition finding techniques that determine the optimal partition by dynamic programming. These techniques may be used at a control level to periodically update the block partition in order to track optimality if the filter length varies over time.

Figure 19:
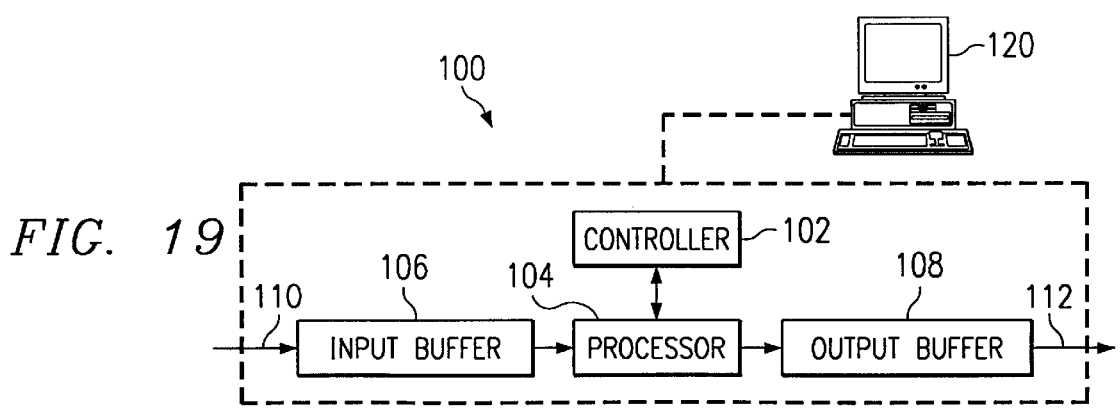
FIG. 19 illustrates an exemplary system implementing multiple-FDL convolution and an optimal partition finding process.

FIG. 19 illustrates a system 100 implementing multiple-FDL convolution and optimal partition finding. System 100 includes a controller 102, a processor 104, an input buffer 106, and an output buffer 108 that may each be implemented using any combination of hardware, software, or firmware operating on one or more computer systems 120 at one or more locations. In implementing the optimal partition finding process and determining the impulse response 50 of a selected filter, controller 102 determines the optimal partition, partitions the filter impulse response accordingly, and performs a DFT on each block 54 of the partition using the FFT. Controller 102 communicates the DFTs to processor 104. A signal 110 to be processed (for example, a sequence of audio or video samples) is received at input buffer 106 and communicated to processor 104. Input buffer 106 may receive the input sample blocks from a signal generation device, an analog-to-digital converter, another signal processing component, or any other appropriate component or device. Signal 110 may be communicated to processor 104 from input buffer 106 in the form of blocks of samples of signal 110.

Processor 104 implements single-, dual-, or multiple-FDL convolution as described above. For each FDL, processor 104 receives an input sample block of an appropriate size from input buffer 106 and the DFTs of the impulse response blocks 54 from controller 102. Processor 104 determines the DFT of the input sample block using an FFT algorithm and performs a spectral multiplication of the DFT of the input sample block with the DFT of each impulse response block 54. For each FDL, processor 104 then overlap-adds the spectral blocks resulting from the spectral multiplication to form a complete output spectral block (and typically one or more incomplete output spectral blocks resulting from the overlap, which will be completed by subsequent overlap-adds). Processor 104 performs an inverse FFT on the complete output spectral block to create an FDL output sample block for each FDL. If more than one FDL is used, the FDL output sample blocks of the FDLs are overlap-added to create a filter output sample block, which processor 104 communicates to output buffer 108 for communication to another signal processing component, a digital-to-analog converter, a signal reproduction device, or any other appropriate component or device. If a single FDL is used, the FDL output sample block is the filter output sample block.

If controller 102 and processor 104 are implemented in software, they may be loaded and executed on a DSP, a host general purpose chip, or any other appropriate component. Controller 102 may be located in the same chip as processor 104, or they may be located in separate chips that communicate with each other. In an exemplary embodiment, controller 102 is implemented in software executing on a host chip and processor 104 is implemented in software executing on a DSP. Controller 102 may not need to be executed as often as processor 104, since the filter impulse response 50 may vary slowly over time and thus the frequency response does not need to be calculated for every block. If the filter impulse response 50 is constant, controller 102 may execute only once during the initialization of system 100.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for signal processing using one or more filters, comprising:
a controller operable to partition an impulse response of a filter into a plurality of impulse response blocks and to calculate a Discrete Fourier Transform (DFT) of each impulse response block using a Fast Fourier Transform (FFT) algorithm; and
a processor coupled to the controller operable to:
receive an input sample block comprising samples of a signal to be processed;
receive the DFT of each impulse response block from the controller;
calculate a DFT of the input sample block using an FFT algorithm;
perform a spectral multiplication of the DFT of the input sample block with the DFT of each impulse response block;
overlap-add the blocks resulting from each spectral multiplication to create an output spectral block;
perform an inverse FFT on the output spectral block to create an output sample block; and
communicate the output sample block.

2. The system of claim 1, wherein the controller is operable to partition the impulse response into a frequency-domain delay line (FDL) comprising blocks of uniform size.

3. The system of claim 1, wherein the controller is operable to partition the impulse response into a first frequency-domain delay line (FDL) comprising blocks of a first size and a second FDL comprising blocks of a second size.

4. The system of claim 3, wherein:
the size of the blocks comprising the first FDL is determined according to a latency requirement; and
the number of the blocks comprising the first FDL and the number and size of the blocks comprising the second FDL is determined so as to minimize computational cost.

5. The system of claim 3, wherein the second block size is equal to $$-\frac{kN}{2\ln(2)} + \sqrt{\left(\frac{kN}{2\ln(2)}\right)^2 + NT},$$

rounded to an integer power of two, where k comprises a proportionality constant, N comprises the first block size, and T comprises the length of the impulse response.

6. The system of claim 3, wherein the processor is further operable to:
receive a first input sample block for the first FDL and a second input sample block for the second FDL;
receive the DFT of each impulse response block from the controller;
calculate a DFT of the first and second input sample blocks using an FFT algorithm;
perform a spectral multiplication of the DFT of the first input sample block with the DFT of each impulse response block of the first FDL;
perform a spectral multiplication of the DFT of the second input sample block with the DFT of each impulse response block of the second FDL;
overlap-add the blocks resulting from each spectral multiplication to create a first output spectral block for the first FDL and a second output spectral block for the second FDL;
perform an inverse FFT on the first and second output spectral blocks to create a first output sample block and a second output sample block;
overlap-add the first and second output sample blocks to create a filter output sample block; and
communicate the filter output sample block.

7. The system of claim 1, wherein the controller is operable to partition the impulse response into a first frequency-domain delay line (FDL) comprising blocks of a first size, a second FDL comprising blocks of a second size, and one or more additional FDLs each comprising blocks of any size.

8. The system of claim 7, wherein:
the size of the blocks comprising the first FDL is determined according to a latency requirement;
the number of the blocks comprising the first FDL is determined so as to minimize computational cost; and
the number and size of the blocks comprising the second FDL and the one or more additional FDLs is determined so as to minimize computational cost.

9. The system of claim 7, wherein the processor is further operable to:
receive an input sample block for each FDL and the DFT of each impulse response block from the controller;
calculate a DFT of each input sample blocks using an FFT algorithm;
perform a spectral multiplication of the DFT of each input sample block with the DFT of each impulse response block of the respective FDL;
overlap-add the blocks resulting in each FDL from the spectral multiplication to create an output spectral block for each FDL;
perform an inverse FFT on each output spectral block to create an output sample block from each output spectral block;
overlap-add the output sample blocks to create a filter output sample block; and
communicate the filter output sample block.

10. The system of claim 7, wherein the controller is operable to partition the impulse response into the FDLs using an optimal partition finding process, the controller operable to:
  define a plurality of states;
  determine the possible transitions between the states;
  calculate the computational cost of the transitions between the states; and
  determine a state sequence that minimizes the computational cost using a dynamic programming technique.

11. The system of claim 10, wherein the controller is further operable to:
  define a state according to the position of a pointer with respect to the blocks of the FDLs, the position of the pointer defined by the size of the block indicated by the pointer and the fraction of the block indicated by the pointer; and
  determine the possible transitions between the states according to at least the following constraints:
    a block of size S cannot start with an offset smaller than S relative to the beginning of the impulse response;
    a block of size S cannot be followed by a block of a size smaller than S; and
    when the pointer indicates a fraction of a block other than the last fraction, the state that is transitioned to must be the state in which the pointer indicates the next fraction of the block.

12. The system of claim 10, wherein the controller is operable to determine a state sequence that minimizes the computational cost using the Viterbi algorithm.

13. The system of claim 1, further comprising:
  a plurality of filters each associated with a separate signal to be processed, the processor creating an output spectral block from an input sample block of each signal using the DFT of the filter impulse response associated with each signal; and
  a mixer operable to add the output spectral blocks associated with the signals and to perform an inverse FFT on the sum of the output spectral blocks.

14. A method for signal processing using one or more filters, comprising:
  partitioning an impulse response of a filter into a plurality of impulse response blocks;
  calculating a Discrete Fourier Transform (DFT) of each impulse response block using a Fast Fourier Transform (FFT) algorithm;
  receiving an input sample block comprising samples of a signal to be processed;
  calculating a DFT of the input sample block using an FFT algorithm;
  performing a spectral multiplication of the DFT of the input sample block with the DFT of each impulse response block;
  overlap-adding the blocks resulting from each spectral multiplication to create an output spectral block; and
  performing an inverse FFT on the output spectral block to create an output sample block.

15. The method of claim 14, wherein partitioning the impulse response into a plurality of blocks comprises partitioning the impulse response into a frequency-domain delay line (FDL) comprising blocks of uniform size.

16. The method of claim 14, wherein partitioning the impulse response into a plurality of blocks comprises partitioning the impulse response into a first frequency-domain delay line (FDL) comprising blocks of a first size and a second FDL comprising blocks of a second size.

17. The method of claim 16, further comprising:
  determining the size of the blocks comprising the first FDL according to a latency requirement; and
  determining the number of blocks comprising the first FDL and the number and size of the blocks comprising the second FDL so as to minimize computational cost.

18. The method of claim 16, further comprising setting the second block size equal to $$-\frac{kN}{2\ln(2)} + \sqrt{\left(\frac{kN}{2\ln(2)}\right)^2 + NT},$$

rounded to an integer power of two, where k comprises a proportionality constant, N comprises the first block size, and T comprises the length of the impulse response.

19. The method of claim 14, wherein partitioning the impulse response into a plurality of blocks comprises partitioning the impulse response into a first frequency-domain delay line (FDL) comprising blocks of a first size, a second FDL comprising blocks of a second size, and one or more additional FDLs each comprising blocks of any size.

20. The method of claim 19, further comprising:
  determining the size of the blocks comprising the first FDL according to a latency requirement;
  determining the number of blocks comprising the first FDL so as to minimize computational cost; and
  determining the number and size of the blocks comprising the second FDL and the one or more additional FDLs so as to minimize the computational cost of the method.

21. The method of claim 19, wherein partitioning the impulse response into the FDLs comprises partitioning the impulse response using an optimal partition finding process comprising:
  defining a plurality of states;
  determining the possible transitions between the states;
  calculating the computational cost of the transitions between the states; and
  determining a state sequence that minimizes the computational cost using a dynamic programming technique.

22. The method of claim 21, wherein the optimal partition finder process further comprises:
  defining a state according to the position of a pointer with respect to the blocks of the FDLs, the position of the pointer defined by the size of the block indicated by the pointer and the fraction of the block indicated by the pointer; and
  determining the possible transitions between the states according to at least the following constraints:
    a block of size S cannot start with an offset smaller than S relative to the beginning of the impulse response;
    a block of size S cannot be followed by a block of a size smaller than S; and
    when the pointer indicates a fraction of a block other than the last fraction, the state that is transitioned to must be the state in which the pointer indicates the next fraction of the block.

23. The method of claim 21, wherein the optimal partition finder process further comprises determining a state sequence that minimizes the computational cost using the Viterbi algorithm.

24. The method of claim 14, further comprising:
  providing a plurality of filters each associated with a separate signal to be processed;

creating an output spectral block from an input sample block of each signal using the DFT of the filter associated with each signal;

adding the output spectral blocks associated with the signals; and performing an inverse FFT on the sum of the output spectral blocks instead of on each output spectral block.

25. Digital signal processing software embodied in a computer-readable medium and operable to perform the following steps:

partitioning an impulse response of a filter into a plurality of impulse response blocks;

calculating a Discrete Fourier Transform (DFT) of each impulse response block using a Fast Fourier Transform (FFT) algorithm;

receiving an input sample block comprising samples of a signal to be processed;

calculating a DFT of the input sample block using an FFT algorithm;

performing a spectral multiplication of the DFT of the input sample block with the DFT of each impulse response block;

overlap-adding the blocks resulting from each spectral multiplication to create an output spectral block; and performing an inverse FFT on the output sample block to create an output sample block.

26. The software of claim 25, wherein partitioning the impulse response into a plurality of blocks comprises partitioning the impulse response into a frequency-domain delay line (FDL) comprising blocks of uniform size.

27. The software of claim 25, wherein partitioning the impulse response into a plurality of blocks comprises partitioning the impulse response into a first frequency-domain delay line (FDL) comprising blocks of a first size and a second FDL comprising blocks of a second size.

28. The software of claim 25, wherein partitioning the impulse response into a plurality of blocks comprises partitioning the impulse response into a first frequency-domain delay line (FDL) comprising blocks of a first size and a second FDL comprising blocks of a second size, and one or more additional FDLs each comprising blocks of any size.

29. The software of claim 25, further operable to:

provide a plurality of filters each associated with a separate signal to be processed;

create an output sample block from an input sample block of each signal using the DFT of the filter associated with each signal;

add the output sample blocks associated with the signals; and perform the inverse FFT on the sum of the output sample blocks instead of on each output block.

30. A method comprising:

receiving an input sample blocks;

partitioning an impulse response of a filter into a plurality of blocks, the impulse response having a length of 65,536 samples, and a first of the blocks into which the impulse response is partitioned being less than 1024 samples in size; and using a Fast Fourier Transform with a proportionality constant equal to 1.5 to convolve the input sample block with the impulse response of the filter using less than 400 multiply-adds.

31. A method comprising:

receiving an input sample block;

partitioning an impulse response of a filter into a plurality of blocks, the impulse response having a length T, and each of the plurality of blocks into which the impulse response is partitioned having a size N; and using a proportionality constant k to convolve the input sample block with the impulse response of the filter using $4k+4k \log(N)+4T/N$ multiply-adds.

32. A method comprising:

receiving an input sample block;

partitioning an impulse response of a filter into a first and second set of blocks, the impulse response having a length T, each of the blocks in the first set of blocks having a size N, each of the blocks in the second set of blocks having a size B; and using a proportionality constant k to convolve the input sample block with the impulse response of the filter using; $4k \log(N)+4B/N+4k \log(2B)+4[(T/B)-1]$ multiply-adds.

* * * * *